United States Patent [19]

Scarborough

[11] Patent Number: 4,710,872
[45] Date of Patent: Dec. 1, 1987

[54] METHOD FOR VECTORIZING AND EXECUTING ON AN SIMD MACHINE OUTER LOOPS IN THE PRESENCE OF RECURRENT INNER LOOPS

[75] Inventor: Randolph G. Scarborough, Palo Alto, Calif.

[73] Assignee: International Business Machines Corporation, Armonk, N.Y.

[21] Appl. No.: 763,481

[22] Filed: Aug. 7, 1985

[51] Int. Cl.[4] .................................................. G06F 9/30
[52] U.S. Cl. ............................................. 364/300
[58] Field of Search ... 364/200 MS File, 900 MS File, 364/300

[56] References Cited

U.S. PATENT DOCUMENTS 4,479,196 10/1984 Ferrer et al. ...................... 364/900

4,567,574 1/1986 Saad'e et al. .................... 364/300 X

Primary Examiner—Raulfe B. Zache
Attorney, Agent, or Firm—R. Bruce Brodie

[57] ABSTRACT

A method is disclosed for increasing the number of procedural language scalar instructions which may be executed on a vector SIMD machine. The method, operative in the compiling of the source-to-object code, utilizes a mapping representation of the source code statements onto a dependence graph and noting that the innermost sensitive level n and loop-independent edges of the program mapped onto the graph can be vectorized if every level n dependence can be reordered to operate as an innermost loop and if there are no cycles after the reordering. This indicates that the code can be vectorized at level n.

8 Claims, 11 Drawing Figures

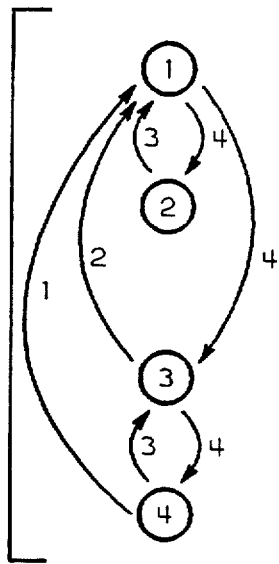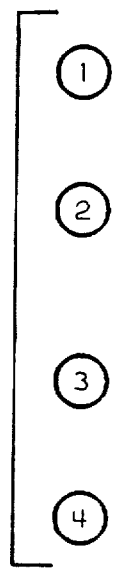
FIG. 3A   FIG. 3B
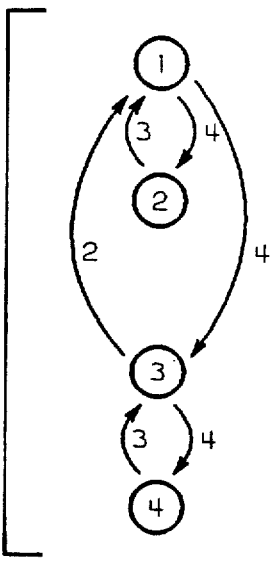
FIG. 4A   FIG. 4B

METHOD FOR VECTORIZING AND EXECUTING ON AN SIMD MACHINE OUTER LOOPS IN THE PRESENCE OF RECURRENT INNER LOOPS

TECHNICAL FIELD

This invention relates to a method for vectorizing and compiling object code from a procedural language source code, including nested loops in the presence of recurrences in the inner loops, for execution on an SIMD machine.

BACKGROUND

Most programs written for computers contain loops and nests of loops for performing repetitive operations on sequences of data. These programs direct that operations be done in a well-defined order. Because single-instruction, single-data path (SISD) machines have historically been the most pervasive type of machines, the order is one that is readily executable on such an SISD machine. This very same order may not be valid on a single-instruction, multiple-data path (SIMD) machine, where successive elements are taken in that order and are operated upon independently in parallel. Other orders may exist, however, in which the elements validly may be taken and operated upon independently in parallel. There exists, therefore, a requirement to ascertain those portions of programs and those orderings of operations for which the SIMD machine may be used to execute the repetitive operations. This requirement and its concomitant result is known as vectorization. It is thus desired to start with a program written for a scalar SISD machine and to produce object code for execution on a vector SIMD machine.

Vectorization is of interest for at least three reasons. First is the large existing body of programming written for SISD machines. An automatic vectorizer makes it possible for the existing programs to be executed on an SIMD machine without requiring that the programs be rewritten. Second is portability. An automatic vectorizer makes it possible to execute the same program, without change, on both SISD and SIMD machines. The third is speed. An automatic vectorizer renders it feasible for the same program to be optimized for scalar when it is run on an SISD machine and to be optimized for vector when it is run on an SIMD machine.

The objective of vectorization is to find sequential scalar operations that can be converted to equivalent parallel vector operations in order to take advantage of inner-vector SIMD machines. Operations are equivalent if, using them, the program produces the same result.

In general, a statement may be vectorized if it does not require, as an input on one iteration of a loop, a value it computed on an earlier iteration of the loop. If no value computed in one iteration of a DO-loop is used in a later iteration, then all of the data values can be computed in parallel. This independence of data values from one DO-loop iteration to the next is a factor in allowing execution on an SIMD machine. In contrast, if a value is computed in one iteration and then used in a later iteration, the DO-loop cannot in general be vectorized.

Vectorization of sequential operations requires that the dependences in the program be determined. A statement in a source program may be dependent upon another statement in the program because the flow of control is affected by one of them or because they both use the same storage locations. Both kinds of dependences must be considered when the program is analyzed for vectorization.

Among the most pertinent prior art references are those by Allen, "Dependence Analysis for Subscripted Variables and Its Application to Program Transformations", Ph.D. thesis, Computer Science, Rice University, April 1983; and Kennedy, "Automatic Translation of FORTRAN Programs to Vector Form", Rice University Technical Report 476-029-4, October 1980. The aforementioned Allen and Kennedy references describe the scalar-to-vector conversion steps of (a) forming a dependence graph, (b) partitioning the graph into topologically significant regions, (c) examining the regions in order to ascertain which regions are executable on an SIMD machine, and (d) generating scalar or vector code based on the results of (c).

In the prior art, recurrences among program statements in selected ones of a nest of loops prevented vectorization of those program statements in the loops which generated the recurrence, and furthermore prevented vectorization of those program statements in the outer loops containing those loops. It is known that the interchange of the order of loops affects vectorizability of statements in the loops. However, because of the complexity and expense involved in identification and interchange of the loops, this has been sparingly employed only on the innermost and next-to-innermost loops.

THE INVENTION

It is an object of this invention to devise a method to automatically ascertain those portions of SISD programs for which an SIMD machine may be used to execute repetitive operations. It is a related object to devise a method for automatically identifying sequences of source code whose object code is written to execute on an SISD machine which instead may be executed on an SIMD machine and yet produce the same results as on an SISD machine.

The method of this invention satisfying the foregoing objects is based upon the unexpected critical observation that, in the dependence graph representing a region of a program at and inside a selected level, level n, only the innermost-sensitive level n dependence edges and the loop-independent dependence edges need be considered to ascertain if the program can be vectorized at level n. The region can be vectorized if the graph formed from just these two classes of edges (the innermost-sensitive level n edges and the loop-independent edges) has no cycles. This contrasts with the method of the prior art, in which all edges in the region, including those at level n, those inside level n, and those which are loop-independent, are included in the graph.

The prior art, having failed to discover and then identify the significance of innermost-sensitive edges, also failed to exclude from the graph the dependence edges at level n which are not innermost sensitive and the dependence edges at levels inside level n. These edges are now known, by the present invention, to be not relevant to the vectorizability of statements at level n. The prior art will, in consequence, more often find a cycle in the graph since there are more edges in the graph, and therefore will fail to ascertain that a very large class of statements may be vectorized at level n. For example, any cycle caused by edges inside level n will prevent vectorization of the statements at level n. The Allen and Kennedy references, once detecting a cycle, dedicate the program statements to scalar processing at level n.

More particularly, the objects are satisfied by a method for vectorizing and compiling object code for execution on an SIMD machine from a procedural language source code including nested loops in the presence of recurrences in the inner loops, the method being executable on a CPU of the von Neumann type. The method steps comprise (a) converting the source code into an intermediate language string and optimizing the string; (b) forming a dependence graph from the string, the nodes of the graph representing statements in the string; (c) partitioning the graph according to the strongly connected regions thereof on a level-by-level basis from outside to inside, in said regions at least one path connecting each node with every other node; (d) ascertaining which strongly connected regions of the partitioned graph are executable on an SIMD machine; and (e) selecting a set of vectorizable, executable, strongly connected regions, and generating vector object code therefrom. With respect to step (d), at the level n region, the method includes the further steps of ascertaining whether each level n dependence may be interchanged with each successive inner loop until the level n loop is the innermost loop. If any such dependence cannot be interchanged, then the region cannot be vectorized at level n. However, if the dependence disappears upon interchange, then it may be ignored. Step (d) further includes the steps of constructing a graph using all level n dependences surviving after interchange to the innermost level and all loop-independent dependences, and then knowing those statements to be vectorizable at level n if the constructed graph has no cycles.

Advantageously, the method of the invention excludes dependences of inner loops and those level n dependences which have disappeared during interchange. Unfortunately, when a level n loop contains two or more loops at level n+1, the vectorization cannot be executed at level n if statements from more than one of these loops are strongly connected at level n.

BRIEF DESCRIPTION OF THE DRAWING

FIGS. 2A-2B illustrate the dependence edges detected according to the prior art and the invention, respectively.

FIGS. 3A, 4A, 5A, and 6A illustrate the resolution attempts according to the prior art for identifying vectorizable statements.

FIGS. 3B, 4B, 5B, 6B illustrate the resolution success according to the method of this invention.

DESCRIPTION OF THE PREFERRED EMBODIMENT AND INDUSTRIAL APPLICABILITY

Figure 1:
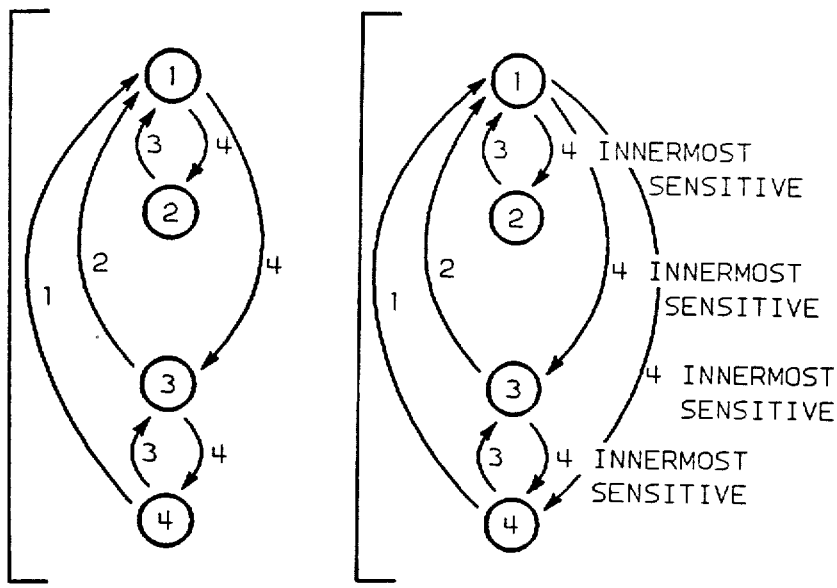
FIG. 1 shows a FORTRAN source code fragment with loops and dependences.

In order to appreciate the invention, a prefatory discussion of the concepts of control and data dependence, dependence level and interchange, and sectioning for vector execution will be set forth. Following this will be an additional discussion of the generalized method. Lastly, an illustrative example referencing the aforementioned drawing will be set out.

Control Dependence

Control dependences arise because one statement determines whether a second statement is to be executed. In the following example, statement 2 depends on statement 1:

```
        DO 3 I = 1,N
    1   IF (A(I).GT.0.0) GOTO 3
    2   A(I) = B(I) + 1.0
    3   CONTINUE
```

The results of the test in statement 1 determine whether statement 2 is executed. The execution of statement 2 depends upon the execution of statement 1. It should be appreciated that IF-conversion is a technique used to convert control dependence to data dependence. The following is an illustration of such a change:

```
        DO 3 I = 1,N
    1   L = A(I).LE.0.0
    2   IF(L) A(I) = B(I) + 1.0
    3   CONTINUE
```

Statement 2 contains the logical scalar L. On each iteration of the loop, L specifies whether or not the corresponding result element in A(I) should be stored. Therefore, the control dependence has been transformed into a conditional assignment statement involving data elements referenced within the statement. The two loops have the same effect.

Data Dependence

Data dependence arises in one of three ways. First, a statement T depends upon a statement S if S defines a value and T references it. Second, a statement T depends upon a statement S if S references a value and T defines it. Third, a statement T depends upon statement S if S stores a value which T also stores.

The first dependence is also called true dependence. It may be illustrated as:

```
        S: X=
        T: =X
```

Clearly, S must execute before T can execute because S defines a value used by T. The execution of T depends upon the execution of S being complete.

The second dependence is also termed anti-dependence. It may be illustrated as:

```
        S: =X
        T: X=
```

Again, S must execute before T; otherwise, T would store the variable X and S would use the wrong value. Again, the execution of T depends upon the execution of S being complete.

The third form of data dependence is also termed output dependence. It may be illustrated as:

```
        S: X=
        T: X=
```

S must execute before T or else the wrong value will be left behind in the variable X. As in the above two cases, the execution of T depends upon the execution of S being complete.

Dependence Level

Dependences attach to a particular DO-loop level in the loop surrounding a group of statements. Some dependences are always present. For instance:

```
        DO J=
        DO I=
    S:  V = A(I,J)*B(I,J)
    T:  Z(I,J) = V
```

T always depends upon S because on every iteration of every loop there is a true dependence involving variable V. Dependences of this type are called loop-independent dependences. That is, they are independent of the operation of the loops surrounding them.

Some dependences are present at one loop level but not another. Thus:

```
        DO J=
        DO I=
    S:  A(I + 1,J) = A(I,J)
```

There is true dependence at the level of the loop with index I. An element stored on iteration 2, for example, will be fetched on iteration 3. This type of dependence is termed a recurrence. But there is no dependence at level J. More particularly, no element stored on one iteration of loop J is referenced on any other iteration.

Dependence Interchange

When a given loop in a nest of DO-loops is chosen for execution in an SIMD machine, each vector (SIMD) instruction will operate on successive data elements selected by that given DO-loop index. For example, if the J loop (the loop with index J) is vectorized in the nest

```
        DO 1 K = 1,N
        DO 1 J = 1,N
        DO 1 I = 1,N
    1   A(I,J,K) = B(I,J,K)
``` then a vector LOAD instruction would fetch the elements of B and store the elements of A in the order (1,1,1), (1,2,1), . . . , (1,n,1). This is a different order than that which would be used in scalar mode where the innermost DO-loop with index I would cycle most rapidly. In fact, the vector order is exactly that which would have been seen in scalar mode if the J loop had been interchanged with its inner neighbors until it became the innermost loop, i.e.

```
        DO 1 K = 1,N
        DO 1 I = 1,N
        DO 1 J = 1,N
    1   A(I,J,K) = B(I,J,K)
```

In order for a given loop to be chosen for execution in an SIMD machine, this interchange must be valid. That is, it must preserve the semantics of the source code.

For the K loop in the original example to be vectorizable, the loop ordering

```
        DO 1 J = 1,N
        DO 1 I = 1,N
        DO 1 K = 1,N
    1   A(I,J,K) = B(I,J,K)
``` would have to generate the same results as the original. The other loops need not be permuted. It is necessary only to inquire if the loop of interest may be moved inside of all of the other loops.

Occasionally, this loop interchange is not possible. In the nest:

```
        DO 1 J = 1,N
        DO 1 I = 1,N
    1   A(I − 1, J + 1) = A(I,J)
``` there is a dependence at the level of the J loop. Here, a value stored on one iteration of J is fetched on the next. Many dependences do not affect the results of a process when loops are interchanged. However, in this example, the J loop could not be interchanged with the I loop because the answers would be changed. This illustrates an interchange-preventing dependence. Of course, it prevents the vectorization of the J loop.

In a multilevel nest, a dependence might be interchangeable part of the way into the innermost level but then be blocked. Such a dependence is termed an innermost-preventing dependence because that level of the loop cannot be moved to the innermost level. If a loop cannot be moved into the innermost level, then it cannot be vectorized.

Sectioning for Vector Execution

As discussed above, in order to be vectorizable (rendered fit for SIMD execution), a loop must be validly movable to the innermost position. It is not necessary to physically render this interchange. Instead, during the compiler portion of code generation, there are generated vector instructions which access groups or sections of elements selected by the chosen loop. The loop controls for the chosen loop are left in their original place and are changed so that they are incremented by the number of elements in the groups processed by the individual instructions.

Aspects of the Inventive Method

In the method of this invention, a graph containing all dependence edges in the program is partitioned into strongly connected regions at the outermost level. Each such region is considered in turn. Within each region, each dependence at the DO-loop level defining the region is considered. The method attempts to interchange this dependence until the original loop has become the innermost loop. If this interchange is not possible, then the region cannot be executed by an SIMD machine at the level defining the region. The method thus terminates for this region at this level. On the other hand, if interchange is possible but the dependence itself disappears on its way into the innermost loop because it is absorbed by a dependence at an intervening loop, then the dependence is ignored since it will not affect the SIMD execution at the level defining the region. Otherwise, the dependence is noted as an "innermost-sensitive" dependence for the region.

Next, using only the "innermost-sensitive" dependences and the loop-independent dependences in the region, a graph is formed. If this graph has a cycle, then the region may not be executed SIMD at the level defining the region. Otherwise, the region is eligible for SIMD execution even though other loops inside the loop defining the region may have recurrences.

At this point, it is noted that the region may be executed SIMD. Inner regions are then recursively considered, each being marked in the same manner as executable validly in SIMD or not.

At this point, it should be apparent that the structure is quite different from that produced according to the prior art. In the prior art, the methods of Allen and Kennedy produced sequential DO statements for all regions containing recurrences. Further, their methods concluded that SIMD execution is possible only for the inner regions containing no recurrences. It is at this juncture that the prior art has completed its task.

In the method of this invention, additional source code statements have been ascertained to be vectorizable at additional levels of nesting as a result of the foregoing steps of the method. The method now selects one instruction path from a set of prospective instruction paths for converting the scalar procedural language source code to a code form suitable for execution on an SIMD machine. In this regard, the method steps comprise (a) converting the source code into an intermediate language string and optimizing the string; (b) forming a dependence graph from the string, the nodes of the graph representing statements in the string; and (c) ascertaining a least cost path through the dependence graph taking into account the type, number, and distribution of instructions, their execution time, and the cost of associated resources.

To typify this refinement in the invention, consider the following example. Let there exist a nest of loops which in general may be executed either by scalar or vector instructions with the vector (SIMD) machine applied to any of, but only one of, the loops in the nest. For instance, in the nest:

```
       DO 1 K = 1,N
       DO 1 J = 1,N
       DO 1 I = 1,N
       A(I,J,K) = B(I,J,K) + P(J,K)*Q(J,K)
     1 E(K,J,I) = F(K,J,I) + X(I,J)*Y(I,J)
``` there exist four possibilities for each statement (vectorize on K, J, I, or not at all). Thus, 16 possibilities exist for the combination of the two statements. The object of the refinement of the method of this invention is to ascertain the most rapidly executing among these possibilities. Several factors are to be considered in estimating the cost of execution. These include the cost of loop overhead, the cost of hardware instructions, and the cost of fetching and storing operands. It is appreciated that these costs will vary for the same statement as each enclosing loop is considered as the candidate for execution on the SIMD machine.

The refinement implements a modified least cost graph traversal algorithm. Heuristics must be employed to resolve, for example, when two statements originally from the same nest of loops but subsequently partitioned into independent regions of the graph may actually be merged back into the same set of loop controls when object code is generated for the statements.

The regions identified in the original method of this invention, when each was marked as eligible or not for SIMD execution, are now sorted into topological order based upon dependence as part of that process. The least cost graph traversal considers these regions in topological order beginning with a null first region and ending with a null final region. The method refinement produces and maintains a list of the processor time required to execute the statements in subsets of these regions. The subsets always begin with the null first region in the topological ordering and always end with some other region in the ordering. Always included are all regions between the two. Each region on the particular path under consideration has its cost estimated for SISD or SIMD execution depending upon the execution possibility represented by the path.

Each element on the list represents the execution of the regions on the path from the null first region through the last region on the path with each region being executed in a particular manner, i.e. either SISD or SIMD. The refined method estimates the cost for executing this entire collection of the regions heuristically minimizing the number of loop control statements which must be inserted. Once this cost has been ascertained, the next possible candidate regions for execution along this path are identified. These candidates will be the next region in the topological ordering executed SISD and, if valid for the region, SIMD. These candidates and the just estimated cost of execution to reach them are then posted onto the list of pending possible execution paths.

When a candidate region is marked as an SISD candidate, inner regions of that candidate subsequently will be considered as candidates, either SISD or SIMD. When a candidate region is marked as an SIMD candidate, all inner regions are SISD candidates and are bypassed to expedite processing.

The refined method iterates by selecting from all elements on the list the one with the next candidate having the minimal cost associated therewith along its particular path of execution possibilities, by ascertaining the cost of including it in execution with its predecessors, by locating its possible successors, and by posting them together with the cost of reaching them on the list of pending candidates. The refined method terminates when the null final region is selected as the minimal cost candidate to include on a path. The selected path represents a decision for each region as to whether that region is to be executed SISD or SIMD. It further represents a decision as to how the regions are to be merged into fewer regions for the purposes of minimizing the loop control statements. The source code string is then reprocessed to implement these decisions. Optimization of a source code string, in particular register optimization, may then be performed and ultimately an object code generated.

ILLUSTRATIVE EXAMPLE

Referring now to FIG. 1, there is shown for purposes of illustration a fragment of FORTRAN source code containing statements numbered 1–4. Referring now to FIG. 2A, there is shown the dependences between these statements when they are mapped onto a graph. The nodes 1–4 of the graph represent the statements 1–4, respectively. In turn, the edges are labeled with a level number also from 1–4 indicating the level of loop causing the dependence. In this case, level 1 dependences are caused by the outermost loop. Likewise, level 4 dependences are caused by the innermost loop. There are no loop-independent dependences in this example. In such a case, they would have been labeled level 5.

FIG. 2A represents a dependence graph constructed according to the prior art. In contrast, FIG. 2B represents a modification of this dependence graph according to the invention arising from the labeling of each edge with additional information stating whether the edge is "innermost-preventing" and whether the edge is "innermost-sensitive". There are no "innermost-preventing" edges in this example.

Referring now to FIG. 3A, there is shown the graph which, according to the prior art, would determine the vectorizability of the statements at level 1. Again in contrast, FIG. 3B shows the graph used pursuant to this invention also to ascertain the vectorizability of the statements at level 1. In FIG. 3B, only the level 1 innermost-sensitive edges and the loop-independent edges are necessary. In FIG. 3A, every statement is in a strongly connected region which, according to the prior art, would not reveal any of them as vectorizable. In contrast, FIG. 3B shows no statement in a strongly connected region. This indicates that all of them may be vectorized at level 1.

Figure 5A:
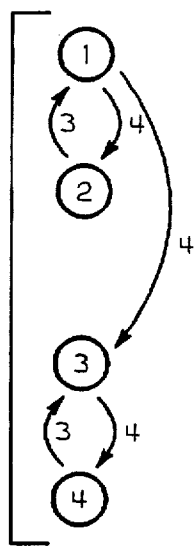
Figure 5B:
Figure 6A:
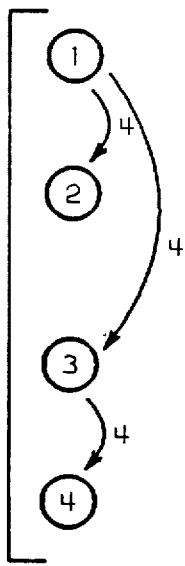
Figure 6B:
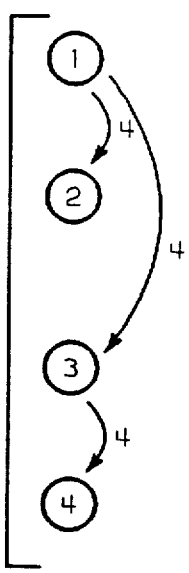

Referring now to FIGS. 4A and 4B, there is shown the graph considered by the prior art and the invention, respectively, in determining the vectorizability of statements at level 2. Again, the prior art shows all statements in a strongly connected region and therefore none as vectorizable. The invention reveals that all the statements in level 2 may be vectorized. Parenthetically, with reference to FIGS. 5A and 5B, there are similar results for level 3. There are two strongly connected regions in the graph of FIG. 5A. In FIG. 5B, according to the invention, the statements are vectorizable at level 3. Lastly, referring now to FIGS. 6A and 6B, these show the graphs for level 4. In this case, the graphs are identical and all statements by both methods are indicated as vectorizable.

Machine Executability

It should be appreciated that the foregoing remarks have subsumed a familiarization with SISD and SIMD processing. A typical SISD processor is described in Amdahl et al, U.S. Pat. No. 3,400,371, "Data Processing System", issued Sept. 3, 1968. Amdahl also described the necessary operating system environment by which procedural language source code sequences can be processed to produce object code in turn executable on SISD or SIMD processors. A high-level language FORTRAN compiler, the IBM VS FORTRAN compiler, is illustrative of the high-level procedural language source-to-object code converter to which this invention may be applied.

SIMD processors suitable for executing vector statements include those set out in Stokes et al, U.S. Pat. No. 4,101,960, "Scientific Processor", issued July 18, 1978; Lorie et al, U.S. Pat. No. 4,435,758, "Method for Conditional Branch Execution in SIMD Vector Processors", issued Mar. 6, 1984; and the references cited therein.

I claim:

1. A method for execution on an SISD machine for ascertaining any source code procedural language statements which are amenable to being compiled into object code for execution on an SIMD machine, comprising the steps of:
   (a) mapping in said SISD machine said source code statements onto n counterpart nodes of a dependence graph, said graph (FIGS. 2A, 2B) having directed edges, the edges connecting nodes according to dependences and selectively forming closed traverses or loops, the edges further being selectively nested and labeled with a level number (FIGS. 2A, 3A, edges labeled 4) indicating the level of any node (1, 2, ..., n) causing the dependence, each edge (FIG. 2B) being further labeled with indicia as to whether it is either innermost-sensitive or innermost-preventing;
   (b) identifying in said SISD machine the statements at the nodes bounding each level of any innermost-sensitive and loop-independent edges of the graph, if at that level, the edges having the labeled dependences can be reordered to operate as an innermost loop and if there are no cycles in the graph after recording; and
   (c) generating in said SISD machine object code obtained from any statements identified in step (b).

2. The method according to claim 1, wherein the source code procedural language statements are consistently selected from one strongly-typed language drawn from a set of strongly-typed languages including FORTRAN, PL/1, PASCAL, ALGOL, ADA, and their equivalents.

3. The method according to claim 1, wherein the dependences include control and data dependences, loop-independent, innermost-sensitive, and interchange-preventing dependences.

4. A method for vectorizing and compiling object code for execution on an SIMD machine, said object code being derived from procedural language source code statements, said source code including nested loops in which at least one loop is innermost and at least one loop is outermost, said nested loops occurring where at least one innermost loop and at least one outermost loop recur, said method being executable on an SISD machine, comprising the steps of:
   (a) converting in said SISD machine source code into an intermediate language string and optimizing said string;
   (b) forming in said SISD machine a dependence graph from the string, said dependence graph including at least one node, the nodes of the dependence graph representing statements in the string;
   (c) partitioning the dependence graph into regions, said partitioning occurring within the SISD machine, the regions being denominated "strongly-connected regions" (SCRs), each node in an SCR being connected to every other node by at least one path, said partitioning being conducted on a level-by-level basis from outside to inside;
   (d) ascertaining in said SISD machine which SCRs of said dependence graph partitioned according to step (c) are executable on an SIMD machine by:
      (1) ascertaining at each level within a region and for each dependence at that level whether the dependence at that level is interchangeable with each successive inner loop until any preselected one of the loops at that level is the innermost loop, and
      (2) forming in said SISD machine a subgraph from all dependences at that level which are ascertained to be interchangeable to the innermost loop and all loop-independent dependences, the statements constituting the subgraph being vectorized at that level if said subgraph is acyclic; and (e) generating in said SISD machine object code for the statements constituting the subgraph.

5. The method according to claim 4, wherein in step (d) if any such dependence cannot be interchanged, then the SCR cannot be vectorized at that level; and if the dependence disappears upon interchange, then it constitutes a processing nullity and may be ignored.

6. The method according to claim 4, wherein the source code procedural language statements are consistently selected from one strongly-typed language drawn from a set of strong-typed languages including FORTRAN, PL/1, PASCAL, ALGOL, ADA, and their equivalents.

7. The method according to claim 4, wherein the dependence include control and data dependences, loop-independent, innermost-sensitive, and interchange-preventing dependences.

8. The method according to claim 4, wherein said method further comprises the step of ascertaining in said SISD machine a least-cost path through the dependence graph taking into account a predetermined type, number, and distribution of statements, execution time of the statements, and cost of associated resources.

* * * * *